United States Patent [19]
Kurihara et al.

[11] Patent Number: 5,664,245
[45] Date of Patent: Sep. 2, 1997

[54] CAMERA SYSTEM HAVING A CAMERA BODY WITH A POWER SUPPLY AND AN ACCESSORY ATTACHABLE TO THE CAMERA BODY

[75] Inventors: Katsumasa Kurihara, Urawa; Toshiaki Hozumi, Setagaya-ku, both of Japan

[73] Assignee: Nikon Corporation, Tokyo, Japan

[21] Appl. No.: 497,157

[22] Filed: Jun. 30, 1995

[30] Foreign Application Priority Data

Sep. 7, 1994 [JP] Japan ................................... 6-213723

[51] Int. Cl.$^6$ ............................................... G03B 7/26
[52] U.S. Cl. ................................... 396/303; 396/532
[58] Field of Search .......................... 354/286, 484; 396/301, 303, 529, 531, 532

[56] References Cited

U.S. PATENT DOCUMENTS 4,922,283  5/1990  Fukui ............................. 354/484
4,924,249  5/1990  Aihara et al. ................... 354/286
5,043,754  8/1991  Aihara et al. ................... 354/286

*Primary Examiner*—David M. Gray

[57] ABSTRACT

A camera system having a camera body which is attachable to an accessory, such that the camera body includes a detection unit to detect that the accessory is in the process of being installed on the camera body, the detection unit having a detachment pin which sets a detachment switch ON or OFF. When the detection units detects that the accessory is in the course of installation, a semiconductor switching element (a MOSFET) is set OFF, and the provision of a power supply from a battery to a contact point of a electrical contact point unit of the camera body is stopped. As a result, the power supply is not provided to the accessory and various disadvantages are avoided when the accessory is in the course of installation. In addition, the power supply can be safely provided to the accessory regardless of any communication.

16 Claims, 7 Drawing Sheets

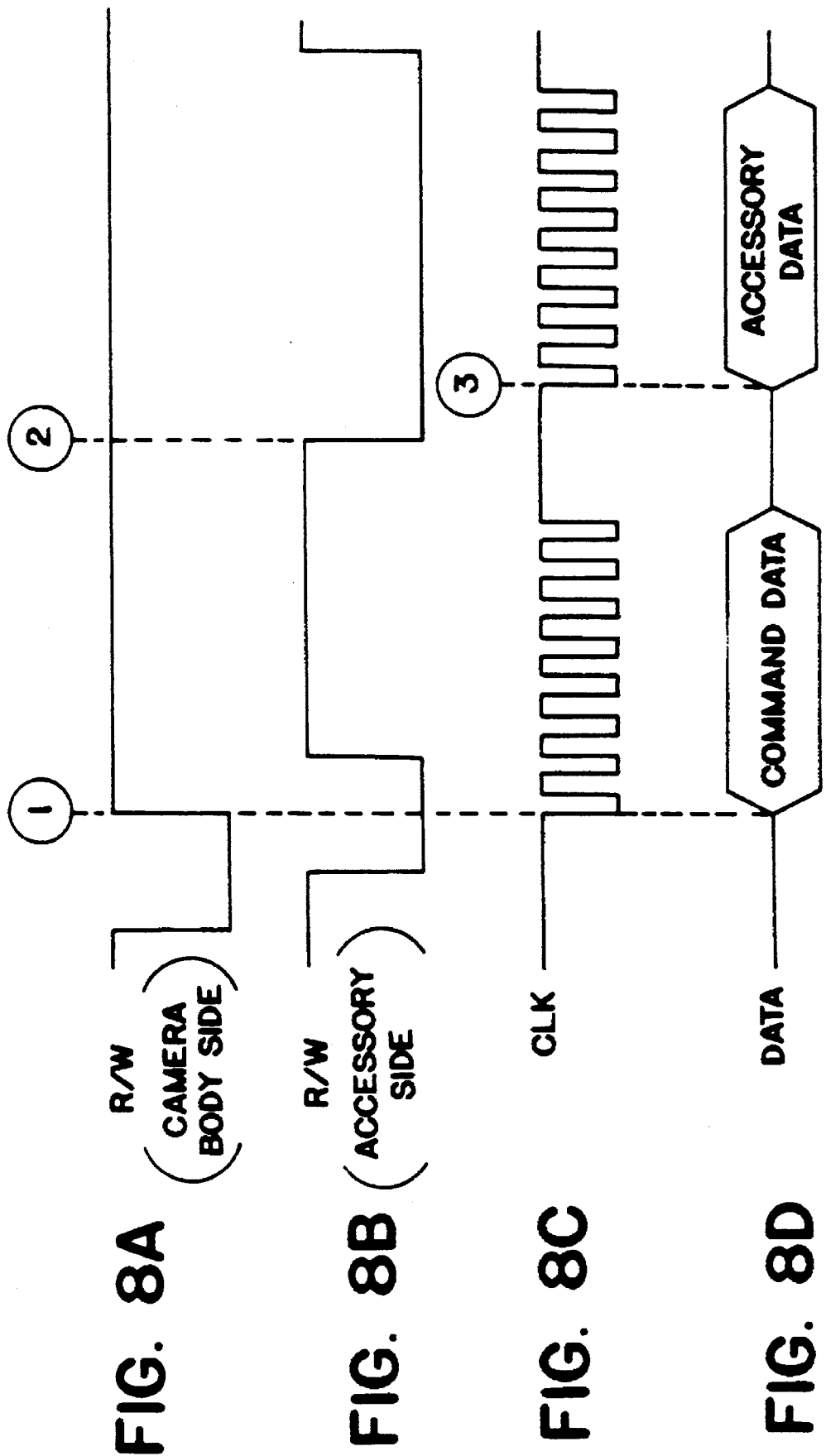

CAMERA SYSTEM HAVING A CAMERA BODY WITH A POWER SUPPLY AND AN ACCESSORY ATTACHABLE TO THE CAMERA BODY

BACKGROUND OF THE INVENTION

1. Field of the Invention

The present invention relates to a camera system having a camera body with a power supply and, more particularly, to a camera system having a camera body with a power supply for supplying power to an accessory, such as a lens, a strobe, a data back (for putting photographic information on fill of the camera system) or a remote control, of the camera.

2. Description of the Related Art

In a conventional camera, in the case of providing power to an accessory attachable to such a camera, by connecting the camera body directly to the accessory without special control, the output of the camera body is arranged so as to be able to output power to the connection contact points of the camera body and the accessory. However, in this kind of device, the provision of power to the accessory is not under the control of the camera body. Accordingly, the power supply is output to normal connection contact points of the camera body and the accessory, and at the time of installation of the accessory to the camera body, the accessory comes into contact with the contact points for communication use and other electrical contact points of the camera body. In particular, by the accessory coming into contact with contact points for a power supply of a motor, etc., because the output impedance is rather low, it is possible for circuits of the accessory to be damaged.

A device for improving on this feature is disclosed, for example, in Japanese Laid-Open Patent Publication 62-175. In this conventional device, an installation of an accessory to a camera body is detected and a first power supply for communication use is provided. If proper communication is established, a second power supply for a motor and the like of the accessory is provided to the accessory.

This conventional device is effective in avoiding the above-mentioned disadvantage, but if communication is not established, the second power supply for the motor and the like of the accessory is not provided, so that no power is provided on the accessory side (to the accessory) before communication is established. Accordingly, using the second power supply on the accessory side as the power supply for other circuits is not possible. Moreover, in a situation such as frequently performing communication, if communication error or data alteration occurs, there is a risk of power supply cutoff.

SUMMARY OF THE INVENTION

Accordingly, it is an object of the present invention to provide a camera system having a camera body with a power supply and an accessory attachable to the camera body, wherein power from the power supply is supplied from the camera body to the accessory stably and independently of communication, while avoiding disadvantages in the course of installation of the accessory to the camera body.

Additional objects and advantages of the invention will be set forth in part in the description which follows, and in part, will be obvious from the description, or may be learned by practice of the invention.

Objects of the present invention are achieved by providing a camera system comprising a camera body and an accessory installed on the camera body and communicating via electrical contact points in the camera body. The accessory includes a motor which drives the different units of the accessory, a drive circuit to drive the motor connected to the electrical contact points, and a first control unit which performs communication with the camera body via the electrical contact points and which, in addition, controls the drive circuit. The camera body includes a power supply, a detection unit which detects the installation of the accessory to the camera body, and a power supply control unit which, according to the detection output of the detection unit, controls the output of the power supply to one of the electrical contact points.

The power supply control unit comprises a switching element, and a switching control unit which, according to the output of the detection unit, controls the switching ON and OFF of the switching element. The power supply control unit, according to the presence of an output of the detection unit that the accessory is being installed on the camera body, blocks the transmission of power from the power supply to the one electrical (power) contact point and, thus, to the drive circuit of the accessory. In response to an absence of an output from the detection unit that the accessory is being installed on the camera body, the power supply control circuit supplies power from the power supply to the one electrical (power) contact point and, thus, to the drive circuit of the accessory.

The accessory may include a lens and a motor to drive the lens, wherein the drive of the motor of the accessory focuses the lens to provide a focussed picture to be taken. The accessory may further include a conversion circuit, which receives power from the power supply via the power supply control circuit, and converts power (a voltage) from the power supply to the first control unit. The power supply control unit controls the transmission of the power supply by the power supply circuit.

The output of the power from the power source to the power electrical contact point is controlled according to the output of the detection unit which detects the installation of the accessory to the camera body. Therefore, during the installation of the accessory to the camera body and, as a result, a connection to the power electrical contact point, transmission of the power supply is stopped. In addition, the power is provided when the accessory is not yet installed and when the installation of the accessory has been completed, thereby avoiding disadvantages arising while the accessory is being installed. Also, independently of communication, a power supply can be stably provided from the camera body to the accessory.

BRIEF DESCRIPTION OF THE DRAWINGS

These and other objects and advantages of the invention will become apparent and more readily appreciated from the following description of the preferred embodiments, taken in conjunction with the accompanying drawings of which:

FIGS. 8A through 8D are timing charts showing the timing of accessory communication time via the electrical contact point unit in the first through third embodiments of the present invention.

DESCRIPTION OF THE PREFERRED EMBODIMENTS

Figure 1:
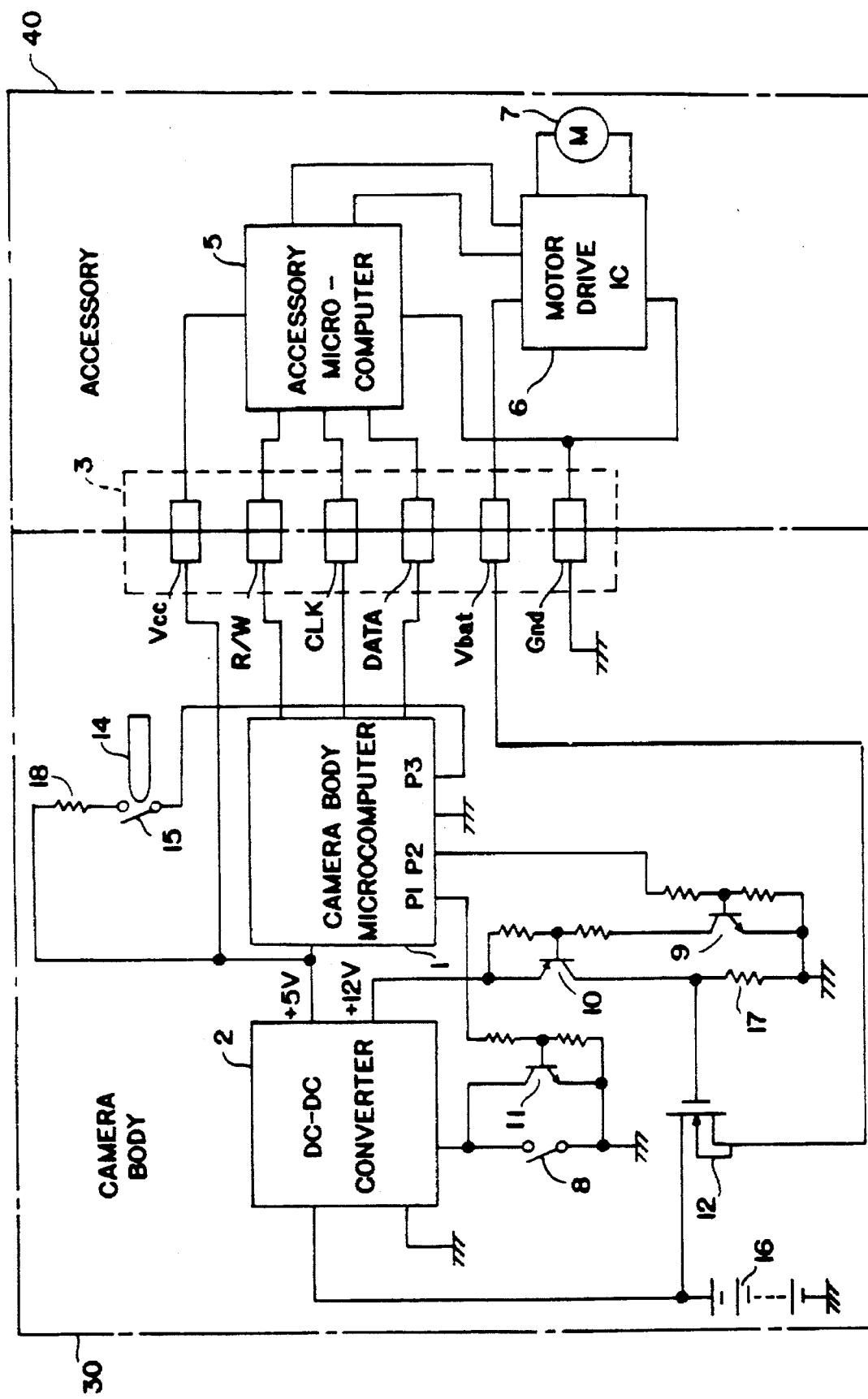
FIG. 1 is a block diagram showing a camera system according to a first embodiment of the present invention.

Reference will now be made in detail to the present preferred embodiments of the present invention, examples of which are illustrated in the accompanying drawings, wherein like reference numerals refer to like elements throughout.

FIG. 1 is a block diagram showing a camera system according to a first embodiment of the present invention. On a camera body side, a camera body 30 has a camera body microcomputer 1 (hereinafter referred to as body microcomputer), and a DC-DC converter 2, which can be connected to electrical contact points on the accessory side of an electrical contact point unit 3 comprising plural contact points. The camera body 30 also includes a half-depression switch 8, transistors 9-11, a MOSFET (MOS type field effect transistor) 12, a detachment pin 14, a detachment switch 15, and a battery 16. The detachment pin 14 and the detachment switch 15 make up a detection unit which detects the course of installation of an accessory 40.

On the accessory side, the accessory 40 includes an accessory microcomputer 5, motor drive IC 6 and motor 7. The accessory may be, for example, a lens, a strobe, a data back for writing information on film stored in the camera body 30, a remote control, etc.

When the body microcomputer 1 is in an operating state and the half-depression switch 8 is set ON, if the accessory 40 has not been installed yet on the camera body 30 or the installation has been completed, as mentioned below, the detachment pin 14 sets the detachment switch 15 to an ON state. Accordingly, an "L" level signal is input at the port P3 of the body microcomputer 1. In this case, the body microcomputer 1 outputs an "H" level signal at the output port P2, thereby setting the transistors 9 and 10 ON. As a result, the MOSFET 12 is set ON, and a voltage from the battery 16 via the MOSFET 12 can be output to contact point Vbat of the electrical contact unit 3 for use by the motor 7 of the accessory 40.

Accordingly, power is provided to the motor drive IC 6 via the contact point Vbat, and the motor 7 enters a state in which operation is possible. In this case, a lens, not shown in the drawing, is disposed on the accessory side in the accessory 40. The body microcomputer 1 performs photometry and focusing for the lens, and the data of this process result, as accessory data mentioned below, is transmitted via contact point DATA of the electrical contact point unit 3, to the accessory microcomputer 5 which receives this accessory data. The accessory microcomputer 5 drives the motor 7 via the motor drive IC 6, causing the lens to move to its focused positioned.

In a situation that the accessory 40 is in the process of being installed on the camera body 30 during an operating state of the camera body 30, the detachment pin 14 is depressed and the detachment switch 15 is in the OFF state.

In this case, an "H" level signal is output at the port P3 of the body microcomputer 1, and an "L" level signal is output to port P2 by the body microcomputer 1 at this time. As a result, the transistors 9 and 10 are turned OFF, causing the MOSFET 12 to be turned OFF. The voltage from the battery 16 to the contact point Vbat is halted and, accordingly, the transmission of power to the accessory 40 for the motor 7 is stopped.

In this manner, when the accessory 40 is not installed or its installation has been completed, power is provided to the various contact points of the electrical contact unit 3. In the case when the accessory is in the process of being installed, the transmission of power to the accessory 40 is stopped.

Figure 2:
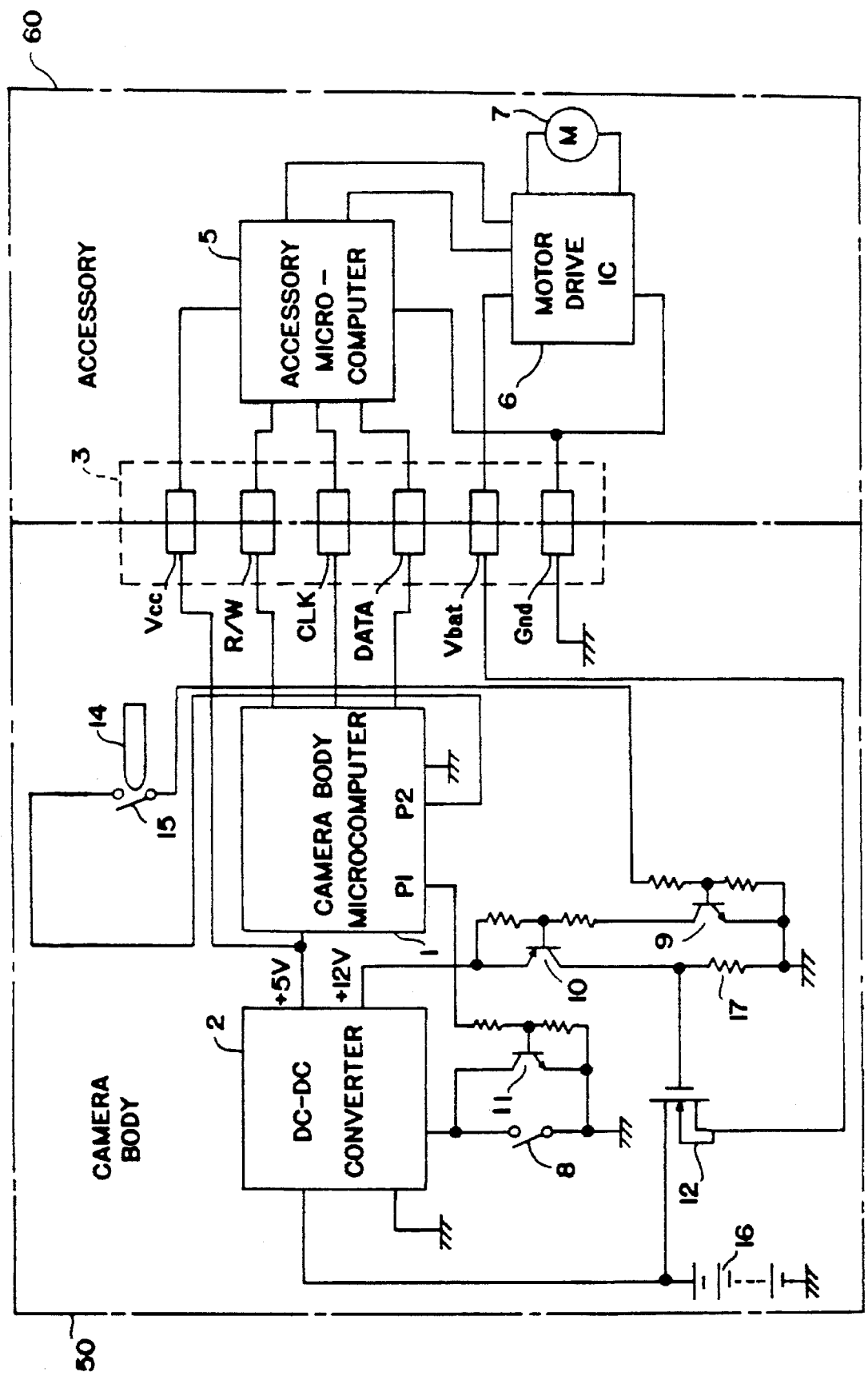
FIG. 2 is a block diagram showing a camera system according to a second embodiment of the present invention.

FIG. 2 is a block diagram showing a camera system according to a second embodiment of the present invention. In FIG. 2, the body microcomputer 1 is set ON when the half-depression switch 8 is ON, during the operation of the body microcomputer 1. In the case that an accessory 60 is not installed on a camera body 50 or when the installation of the accessory 60 has been completed, the detachment switch 15 becomes ON. At this time, the body microcomputer 1 outputs an "H" level signal from the port P2, the transistors 9 and 10 are set ON and, as a result, the MOSFET 12 is set ON, so that a voltage from the battery 16 for use by the motor 7 can be transmitted through the electrical contact point unit 3.

Moreover, in the case that, during the operating state of the camera body 50, the accessory 60 is in the course of installation, the detachment switch 15 becomes OFF. Namely, in this case, the connection between the port P2 of the body microcomputer 1 and the base of the transistor 9 becomes open, resulting in the transistors 9 and 10 and MOSFET 12 being set OFF. As a result, the transmission of power to the accessory 60 for use by the motor 7 is stopped.

Figure 3:
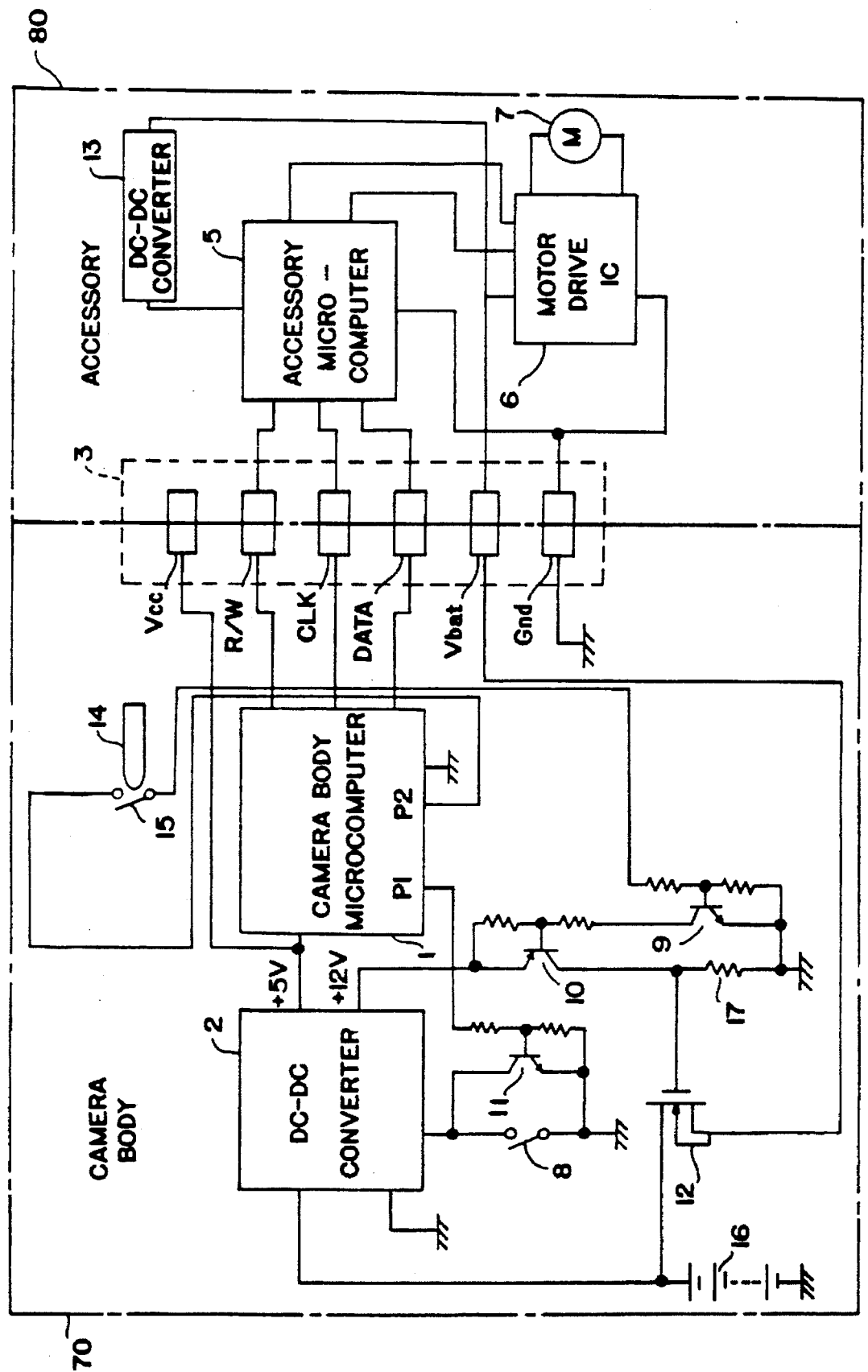
FIG. 3 is a block diagram showing a camera system according to a third embodiment of the present invention.

FIG. 3 is a block diagram showing a camera system according to a third embodiment of the present invention. In FIG. 3, when the half-depression switch 8 is ON, the body microcomputer 1 is placed in an operating state, and the body microcomputer 1 outputs an "H" level signal from the port P2. Then, in the case when the accessory 80 is not installed or when the installation of the accessory 80 has been completed, because the detachment switch 15 is ON, the transistors 9, 10 are set ON by the "H" level signal from the port P2 of the body microcomputer 1. Due to this fact, the MOSFET 12 is set ON, and the contact point Vbat of the electrical contact point unit 3 receives power from the battery 16. Namely, at the accessory side, power provided from the battery 16 of the camera body 70 is transmitted to the microcomputer 5 via a DC-DC converter 13. Accordingly, the supply of power to the accessory 80 is controlled only by the battery 16.

On the other hand, when the accessory 80 is in the course of installation and the camera body 70 is in an operating state, the detachment switch 15 is set OFF, and an open circuit is caused between the port P2 of the body microcomputer 1 and the base of the transistor 9. As a remit, the transistors 9, 10 are set OFF, causing the MOSFET 12 to be set OFF, and all power to the accessory 80 is stopped.

Figure 4:
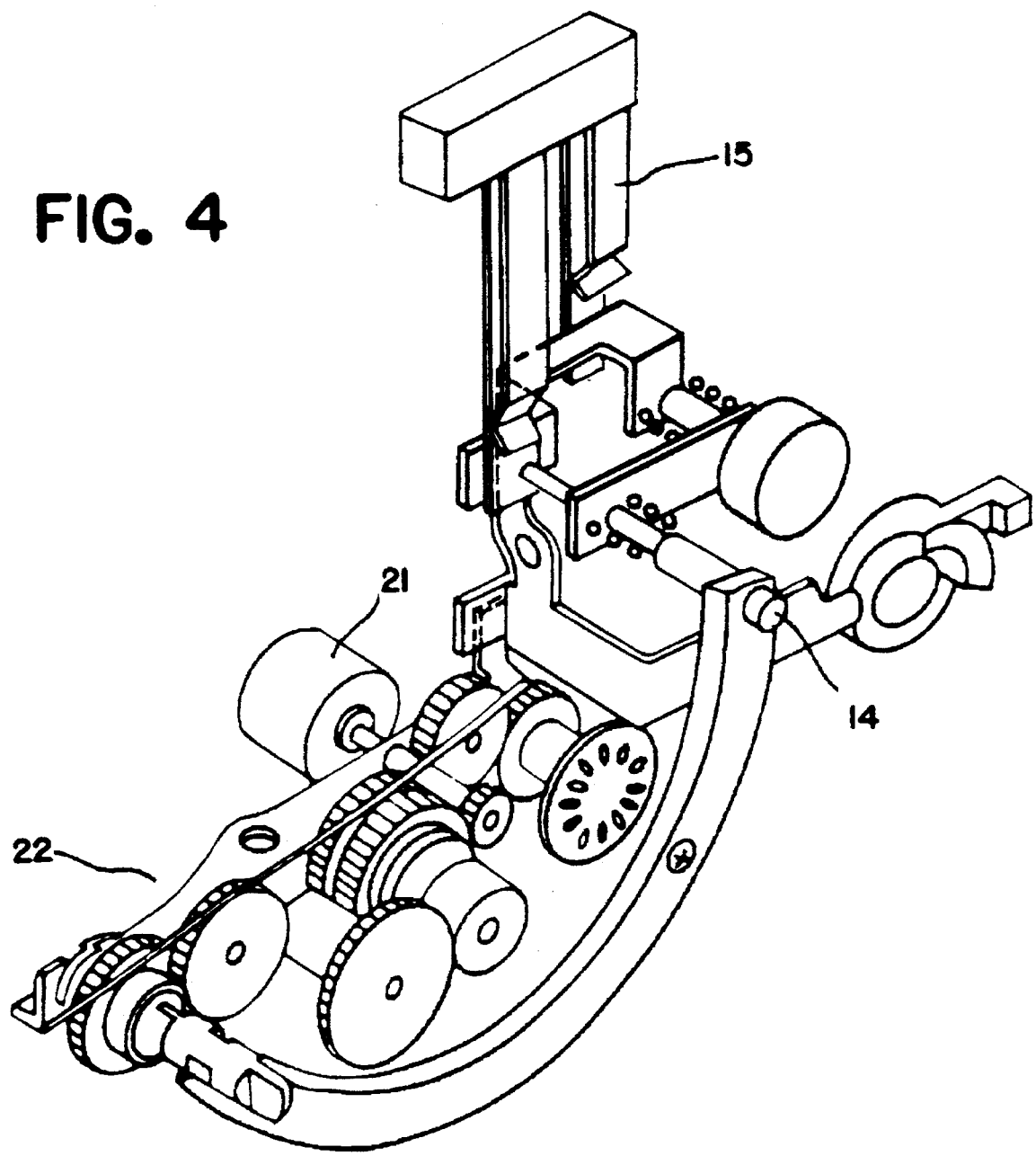
FIG. 4 is an oblique view of an accessory mount unit according to the first through third embodiments of the present invention.
Figure 5:
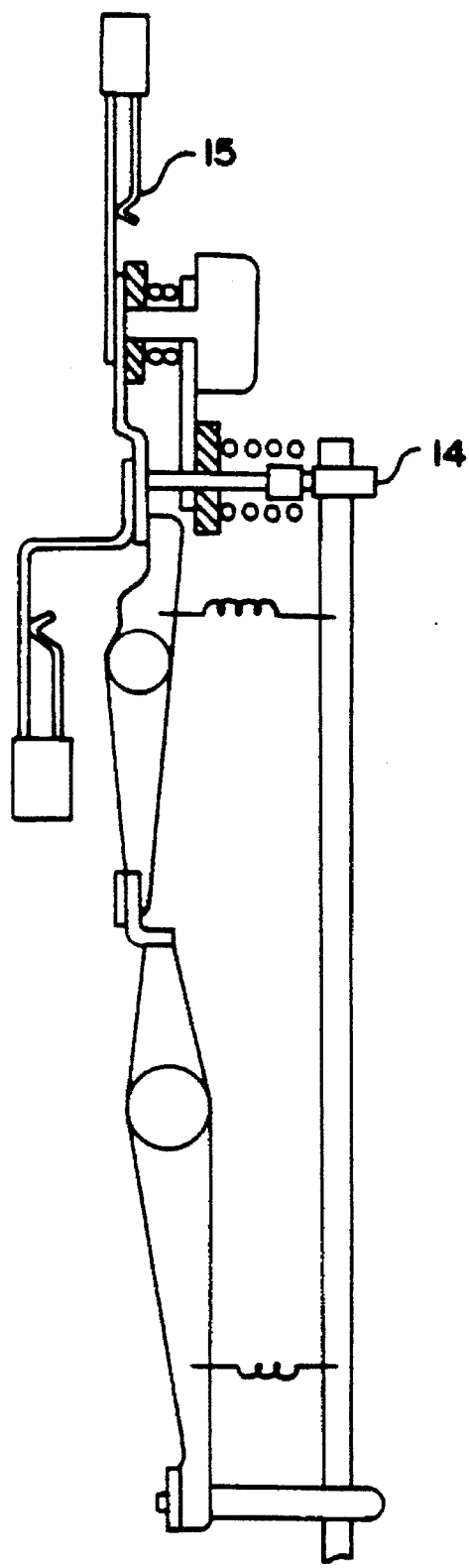
FIG. 5 is a cross sectional view of the accessory mount unit shown in FIG. 4.

Next, FIG. 4 is an oblique view of an accessory mount unit according to any of the first through third embodiments of the present invention, and FIG. 5 is a cross sectional view of the accessory mount unit of FIG. 4. In FIGS. 4 and 5, the accessory mount unit includes the detachment pin 14 and the detachment switch 15 shown in FIGS. 1 through 3. A movable unit 22 is driven by a motor 21 and both are located in the camera body 30 (also camera bodies 50, 70, shown in FIGS. 2 and 3, respectively), and drive various parts in the camera body 30 (50, 70).

In FIGS. 4 and 5, when the accessory 40 (also accessories 60 and 80, shown in FIGS. 2 and 3, respectively) is in the process of being installed on the camera body 30 (50, 70), as mentioned above, the detachment pin 14 is depressed and the contact points of the detachment switch 15 are open, the detachment switch 15 being OFF. Moreover, when the installation of the accessory 40 (60, 80) is complete or when it is not yet installed, the detachment pin 14 is restored to its original position, and the contact points of the detachment switch 15 become closed and the detachment switch 15 is ON.

FIGS. 8A through 8D are timing charts of accessory communication via the respective contact points of the electrical contact point unit 3. Here, FIG. 8A shows the timing of the contact point R/W on the camera body side, FIG. 8B shows the timing of the contact point R/W on the accessory side, FIG. 8C shows the timing of the contact point CLK, and FIG. 8D shows the timing of the contact point DATA.

After power has been provided from the camera body side to the accessory side, accessory communication is performed. In this case, firstly, at a time point ①, which is after the camera body side contact point R/W has gone from an "L" level to an "H" level, the accessory side contact point R/W monitors an "L" level.

Then, if this is an "L" level on the camera body side, clock pulses are output to the accessory side via the contact data point CLK and command data is transmitted to the accessory side via the contact point DATA. Next, the accessory side contact point R/W goes from an "H" level to an "L" level at a time point ②, and at a time point ③ directly after time point ②, clock pulses are output via the contact point CLK. Accessory data, for example, for focusing a lens, are transmitted via the contact point DATA. Based upon the accessory data transmitted to the accessory 40 (60, 80), a lens disposed in the accessory 40 (60, 80) is moved to its focused position.

Figure 6:
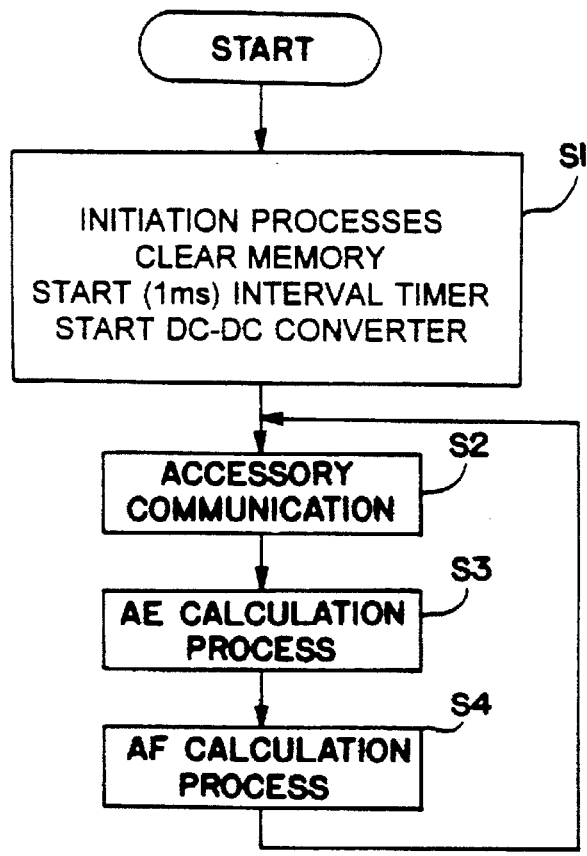
FIG. 6 is a main flow chart showing an operation of a microcomputer of the camera body according to the first through third embodiments of the present invention.

Next, FIG. 6 is a flow chart showing a main process of the body microcomputer 1 of the camera system according to any of the first through third embodiments of the present invention.

Firstly, when the half depression switch 8 is set ON, in step S1, the initiation processes of clearing the built-in memory as mentioned below, the start of a 1 ms (msec) inverter timer, and the start of the DC-DC converter 2, etc., are effected. At step S2, after the end of this initiation process, if power from the battery 16 is provided to the accessory side, accessory communication is performed from the camera body 30 (50, 70) to the accessory 40 (60, 80). Continuing, in step S3, photometry is automatically performed and autoexposure (AE) calculation is performed, and in step S4, an autofocus (AF) calculation is performed and the focus of the lens in the accessory 40 (60, 80) is automatically set. Then, returning to the accessory communication of step S2, the accessory data obtained in the AF calculation process of step S4 is transmitted to the accessory 40 (60, 80). In this manner, the various processes of steps S2, S3 and S4 are reiterated.

Figure 7:
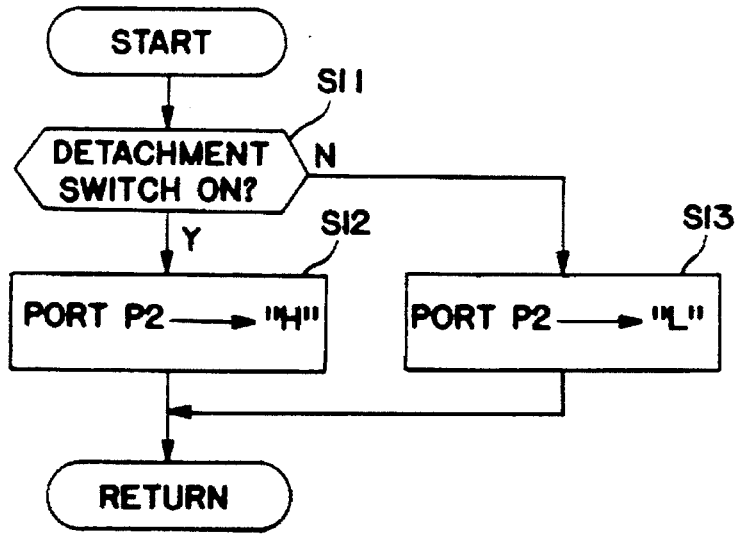
FIG. 7 is a flow chart showing a 1 ms inverter interruption process in the microcomputer shown in FIG. 6 and corresponding to the camera systems shown in FIGS. 1 through 3.

FIG. 7 is a flow chart of the 1 ms inverter timer interruption process of the main process, shown in FIG. 6, of the microcomputer 1. The main process (initiation process) starts a 1 ms interval timer, and when 1 ms elapses, the main process enters into an interruption process. It is first determined in step S11 whether or not the detachment switch 15 has become ON. Then, in the case that the determination in step S11 is "Y", wherein the detachment switch 15 is ON due to the completion of installation of the accessory 40 or the accessory 40 is not yet installed, in step S12 the port P2 is set to the "H" level. The routine returns from the interruption process to the main process. As a result, transmission of power from the battery 16 to the electrical contacts of the camera body is performed.

On the other hand, in the case that the accessory 40 is in the course of installation, the detachment switch 15 is OFF, and in step S13 an "L" level signal is output from the port P2. As a result, the transmission of power from the battery 16 to the accessory 40 is cut off.

In this manner, because the detection unit, elements 14 and 15, for detecting that the accessory 40 is in the process of being installed on the camera body 30, is disposed on the camera body side, power can be safely provided to the accessory 40 from the camera body 30, avoiding the disadvantages arising when the accessory 40 is in the course of installation. Moreover, by making the power supply transmission line of the accessory 40 single, a power supply can be safely provided from the camera body 30, independently of communication.

According to the camera systems described above, a detection unit is disposed in a camera body to detect that an accessory is in the course of being installed to the camera body, and because the output of a power supply disposed in the camera body to the accessory is controlled according to the detection output of this detection unit, the provision of power from a power supply to the accessory is stopped when the accessory is in the course of being installed and, accordingly, the disadvantages arising when the accessory is in the course of installation can be avoided. Also, a power supply can be provided to the accessory independently of data communication.

Because a power supply control unit comprises a switching element and a switching control unit which controls the ON and OFF states of the switching element according to the detection output of the detection unit, power supply control to the accessory can be reliably performed.

Moreover, the power supply control unit stops the provision of power to the drive circuit (motor drive IC), according to the presence of a detection output of the detection unit. In addition, it provides a power supply to the drive circuit, according to the absence of a detection output of the detection unit, the provision of the power supply to the accessory being stopped when the accessory is in the course of installation. In addition, because the power supply is provided to the accessory when the accessory is not yet installed or its installation is complete, the disadvantages which occur when the accessory is in the course of installation are avoided, and power to the motor and the drive circuit of the accessory are provided independently of power for communication with the accessory.

Further, if a lens is disposed as an accessory, because focusing of the lens can be performed by controlling the drive circuit, power can be reliably provided to the drive circuit at the time of controlling the movement of the lens, and in addition, the power is stopped when the lens is in the course of installation to the camera body. Accordingly, the disadvantages arising in the course of installation of the lens can be avoided.

In addition, the power supply control circuit performs the provision of a power supply for the drive circuit and the first control unit in the accessory, in such a way that batchwise control of the power supply to the accessory side is possible.

Moreover, in a camera in which it is possible to install an accessory, in the case that it has been detected that the accessory is in the course of installation, the provision of power to the accessory stops. Therefore, the disadvantages arising when the accessory is in the course of installation can similarly be avoided.

What is claimed is:

1. A camera system comprising:

a camera body having a power supply, a detection unit, body contacts and a power supply control unit; and an accessory attachable to said camera body and having accessory contacts electrically connectable to said body contacts of camera body when said accessory is completely installed on said camera body;

wherein said detection unit has a first state when said accessory is in a process of being installed on said camera body and a second state when said accessory is spaced apart from said camera body and when said accessory is completely installed on said camera body, and said power supply control unit selectively enables transmission of power from the power supply to the body contacts based upon the first and second states of detection of said detection unit.

2. The camera system as claimed in claim 1, wherein said camera body transfers data to said accessory independently of the transmission of power from said camera body to said accessory.

3. The camera system as claimed in claim 1, wherein:
said accessory comprises
    a motor, and
    a drive circuit to drive the motor using power from the power supply; and
wherein said power supply control unit blocks the transmission of power from said power supply to said drive circuit while said accessory in the process of being installed on said camera based upon the first and second states of detection of said detection unit.

4. The camera system as claimed in claim 1, wherein:
said accessory comprises
    a motor, and
    a drive circuit to drive the motor using power from the power supply,
    a processor to process data received from said camera body regarding driving of said motor by said drive circuit; and
wherein said power supply control unit blocks the transmission of power from said power supply to said drive circuit and to said processor while said accessory is in the process of being installed on said camera based upon the first and second detection states.

5. The camera system as claimed in claim 1, wherein said detection unit comprises:
a detachment pin being in a first position while said accessory is in the process of being installed on said camera body, and being in a second position at all other times; and
a switching element being in said first state while said detachment pin is in the first position and in said second state while said detection pin is in the second position.

6. The camera system as claimed in claim 5, wherein:
said camera body further comprises a microcomputer connected to said detection unit and to said power supply control unit; and
said detection unit receives at least some of the power from said power supply;

said detection unit enabling transmission of said at least some of the power from said power supply to said microcomputer when said switching element is in said second state and not enabling transmission of said at least some of the power from said power supply to said microcomputer when said switching element is in said first state and, as a result, said microcomputer controls said power supply control unit to selectively enable transmission of the power from said power supply to said accessory.

7. The camera system as claimed in claim 1, wherein:
said camera body further comprises a microcomputer connected to said detection unit, said microcomputer outputs a control signal, and said detection unit enables transmission of said control signal to said power supply control unit when said switching element is in said second state and does not enable transmission of said control signal to said power supply control unit when said switching element is in first state and, in response, said power supply control unit selectively enables transmission of the power from said power supply to said accessory.

8. The camera system as claimed in claim 1, wherein:
said camera body further comprises a microcomputer connected to said detection unit and to said power supply control unit; and
said detection unit receives at least some of the power from said power supply;
said detection unit enabling transmission of said at least some of the power from said power supply to said microcomputer while said accessory is in the process of being installed on said camera body and, as a result, said microcomputer controls said power supply control unit to enable transmission of the power from said power supply to said accessory.

9. The camera system as claimed in claim 1, wherein:
said camera body further comprises a microcomputer connected to said detection unit, said microcomputer outputs a control signal, and said detection unit enables transmission of said control signal to said power supply control unit while said accessory in the process of being installed on said camera body and, in response, said power supply control unit enables transmission of the power from said power supply to said accessory.

10. A camera system having a camera body and an accessory attachable to the camera body at electrical contact points, said camera system comprising:
said accessory including
    a motor to drive said accessory,
    a drive circuit to drive said motor, and
    a first control unit to perform communication with said camera body via at least one of the electrical contact points and controls said drive circuit; and
said camera body including
    a power supply to generate power,
    a detection unit to detect a process of installing said accessory to said camera body, said detection unit having a first state when said accessory is in the process of being installed on said camera body and having a second state when the accessory is spaced apart from the camera body and when installation of said accessory on said camera body has been completed, and
    a power supply control unit to selectively enable transmission of the power from said power supply to one of the electrical contact points of the camera body, different from the at least one electrical contact point, for use by said drive circuit based upon the detection of said detection unit.

11. The camera system as claimed in claim 10, wherein said power supply control unit comprises a switching element.

12. The camera system as claimed in claim 11, wherein said power supply control unit comprises:

a switching element; and a switching control unit to control switching of said switching element according to the first and second states of detection of said detection unit.

13. The camera system as claimed in claim 10, wherein said power supply control unit enables transmission of the power to the one of the electrical contact points when the accessory is spaced apart from the camera body and when installation of said accessory on said camera body has been completed, and said power supply control unit stops transmission of the power to the one electrical contact point when said accessory is in a process of being installed on said camera body.

14. The camera system as claimed in claim 10, wherein:

said accessory comprises a lens and said drive circuit drives said lens to perform focusing using the power from said power supply.

15. The camera system as claimed in claim 13, wherein said accessory further comprises a power control circuit for selectively enabling transmission of the power to said drive circuit.

16. The camera system as claimed in claim 10, wherein said accessory further comprises:

a conversion circuit for converting the power received from said power supply via said power supply control unit to a voltage potential usable for said first control unit and supplying the voltage potential to said first control unit, wherein said power supply control unit controls transmission of the power from said power supply to said conversion circuit.

* * * * *